United States Patent [19]

Musschoot

[11] Patent Number: 4,565,279
[45] Date of Patent: Jan. 21, 1986

[54] PRODUCT ACCUMULATING CONVEYOR APPARATUS AND METHOD

[75] Inventor: Albert Musschoot, Barrington, Ill.

[73] Assignee: General Kinematics Corporation, Barrington, Ill.

[21] Appl. No.: 657,050

[22] Filed: Oct. 3, 1984

Related U.S. Application Data

[63] Continuation of Ser. No. 272,909, Jun. 12, 1981, abandoned, and a continuation of Ser. No. 582,859, Feb. 24, 1984, abandoned.

[51] Int. Cl.⁴ .............................................. G01G 11/08
[52] U.S. Cl. .................................... 198/505; 198/751; 198/758; 177/255
[58] Field of Search ............... 198/462, 504, 505, 572, 198/573, 579, 751, 752, 758, 771; 177/116, 117, 119, 120, 255

[56] References Cited

U.S. PATENT DOCUMENTS

| | | | |
|---|---|---|---|
| 2,673,082 | 3/1954 | Thurston | 177/255 |
| 2,966,253 | 12/1960 | Gerrans | 198/572 |
| 3,578,094 | 5/1971 | Henry | 198/505 |
| 3,581,871 | 6/1971 | Forman | 198/751 |
| 4,050,572 | 9/1977 | Armstrong | 198/751 |

Primary Examiner—Joseph E. Valenza
Attorney, Agent, or Firm—Wood, Dalton, Phillips, Mason & Rowe

[57] ABSTRACT

A vibratory apparatus and method is provided for cooling product as it is conveyed from one station to another. The vibratory apparatus has a conveyor with means for sensing a predetermined weight of product accumulated at a loading portion of the conveyor whereupon the conveyor is operated to convey the product along the conveyor. When the product has been conveyed a sufficient distance along the conveyor for the weight of the product on the loading portion to fall below a second predetermined weight, the sensing means stops the conveyor. The continuously fed product again accumulates on the loading portion of the conveyor until the sensing means senses the first predetermined weight for again operating the conveyor. The cycle is continuously repeated. The accumulated product dwells a sufficient period of time on the conveyor to cool the product which cooling is aided by the vibratory conveying action.

5 Claims, 4 Drawing Figures

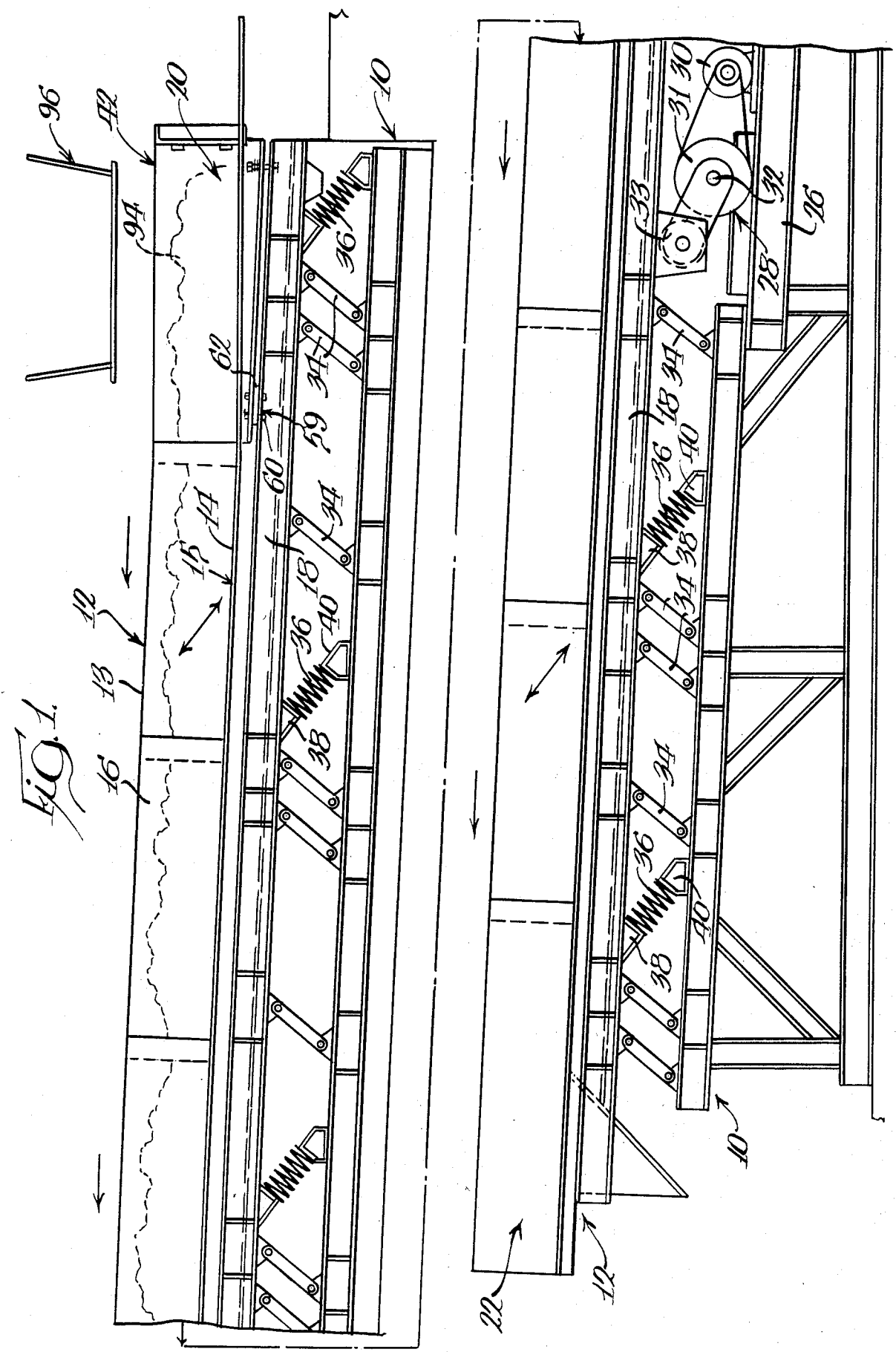

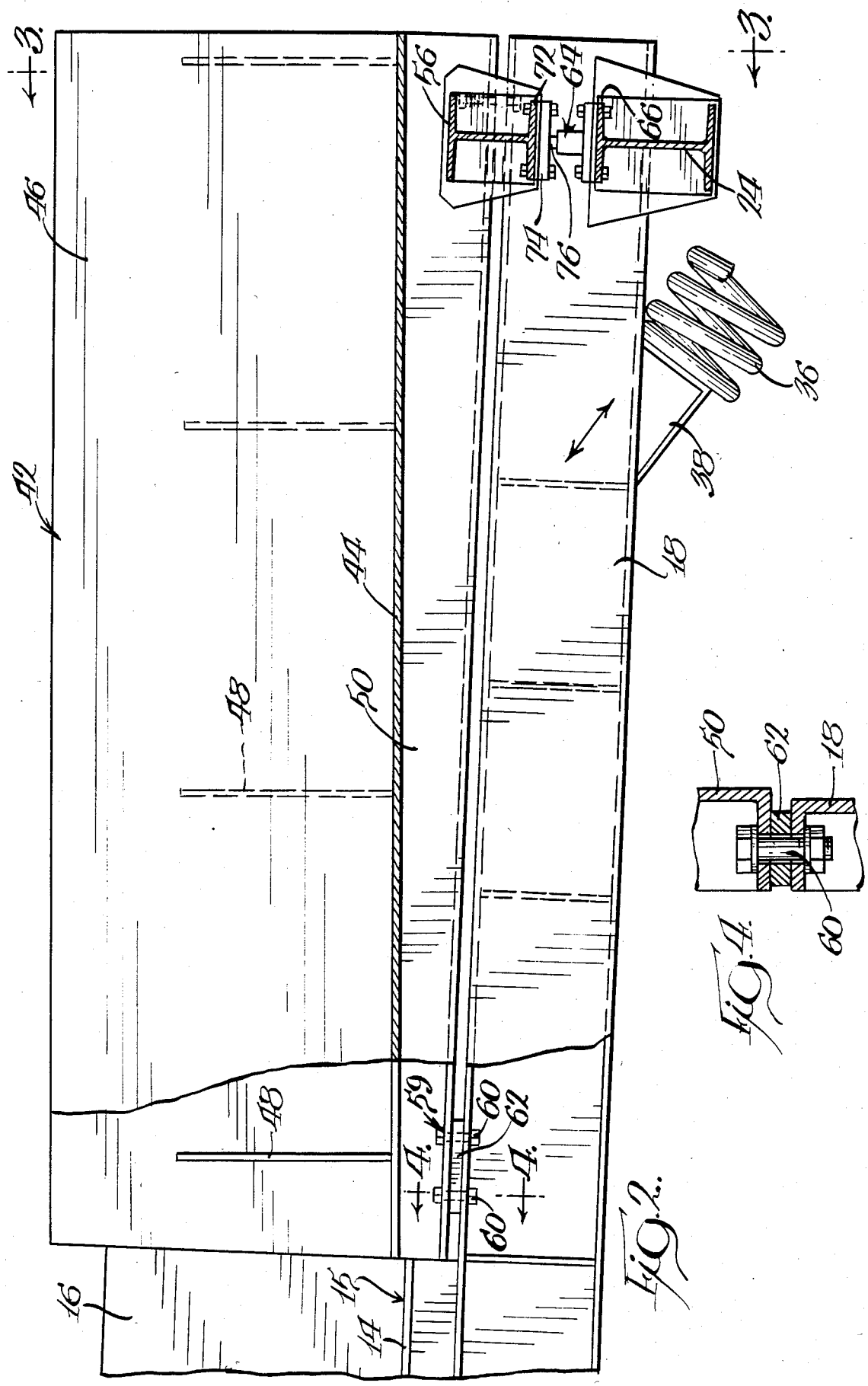

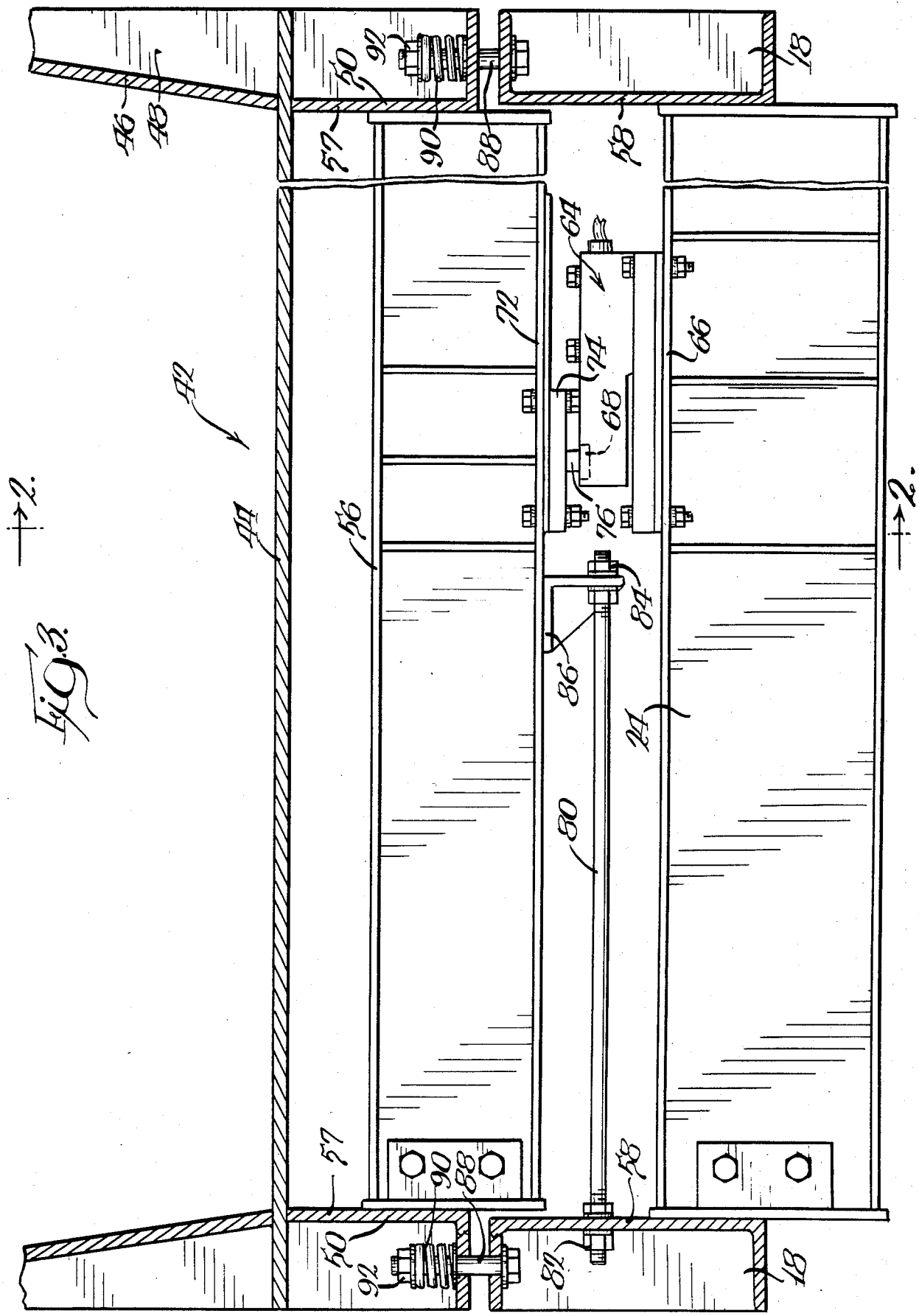

PRODUCT ACCUMULATING CONVEYOR APPARATUS AND METHOD

CROSS REFERENCE

This is a continuation application of Ser. No. 272,909 filed June 12, 1981 and Ser. No. 582,859 filed Feb. 24, 1984, both now abandoned.

DESCRIPTION

1. Technical Field

This invention relates to vibratory conveyors and more particularly to a product accumulating and intermittent conveying apparatus.

2. Background Art

There has been an increasing demand for vibratory conveying apparatus many of which perform functions beyond just conveying material. One such function has been to cool castings as they are conveyed from a preliminary shakeout station to a station where the castings are cool enough to be handled for further processing.

One current system employs an elongated conveyor apparatus upon which a batch of castings are fed onto a loading end of the conveyor, whereupon the conveyor operates for a predetermined time frame to advance the hot castings a short distance and then stops. During a timed dwell, an additional batch of castings are added to the loading end of the conveyor adjacent to the first batch whereupon the conveyor is again operated for a predetermined time frame to advance both batches along the conveyor and the conveyor is again stopped. The time dwell during the loading and the advancing of the castings permits the castings to cool and conveys the castings to another station ready for further processing.

Certain problems can result from a timed system of conveying. One such problem is that the conveyor assembly may activate to advance the batch or batches of product before a full batch of product, or, on occasion, before any product is on the loading end of the conveyor so that the conveyor is operating at a low efficiency level. Another problem is that under certain conditions more product is loaded onto the inlet end portion of the conveyor than the inlet end portion can hold, resulting in some product spilling over the edges of the conveyor onto the floor.

The present invention is directed to overcoming one or more of the problems as set forth above.

DISCLOSURE OF INVENTION

In one preferred form of the present invention, a conveyor apparatus is provided with a base, a conveyor with a conveying surface carried by said base, and a drive assembly for vibrating the conveyor to advance product deposited on a loading end of the conveyor to an outlet end thereof. A weight sensing mechanism is provided for a hopper portion of the loading end of the conveyor which mechanism responds to a predetermined weight of a batch of product that is being fed onto the hopper portion. When the predetermined weight of the batch has been reached, the drive assembly is activated by a signal from the weight sensing mechanism to advance the batch of product along the conveyor to a point where the weight of the batch of product is reduced to a predetermined value thereby shutting off the drive assembly. Since the product is being continuously fed to the hopper portion of the conveyor, shutting off the movement of the conveyor will permit a second batch of product to accumulate on the hopper portion immediately adjacent the first batch until the predetermined weight is again reached whereupon the weight sensing mechanism activates the drive assembly to advance both adjacent batches of product along the conveying surface. The process is repeated until the conveyor has an even accumulation of product therealong with product being discharged at the outlet end of the conveyor onto another conveyor, into bins or the like.

By predetermining the conveying rate and by predetermining the length of the conveying surface, the time it takes for each product to traverse the conveying surface is sufficient for the product to have cooled to the desired state. If, for instance, the conveyor is being used to cool castings, the cooling is accomplished not only by the time delay occasioned by the sequential movement of the castings, but also by the vibratory conveying of the castings which tumbles, shakes and vibrates the castings for maximum cooling.

A unique mounting is provided for the hopper portion of the conveyor which affords a stable connection between the hopper portion and the weight sensing mechanism to assure positive interconnection without interfering with the weight sensitive nature of the weighing mechanism and without adversely affecting the conveying ability of the conveyor apparatus.

BRIEF DESCRIPTION OF DRAWINGS

FIG. 1 is a side elevation of the apparatus broken apart into two elements;

FIG. 2 is an enlarged side elevation of a discrete hopper portion forming the loading end of the conveyor apparatus;

FIG. 3 is a cross sectional view taken along the lines 3—3 of FIG. 2; and

FIG. 4 is a cross sectional view taken along the lines 4—4 of FIG. 2.

DESCRIPTION OF THE PREFERRED EMBODIMENT

An exemplary embodiment of a vibratory conveyor system made according to the invention is illustrated in FIG. 1 and comprises an elongated horizontal base 10 having an elongated conveyor 12 mounted above the same. The conveyor 12 is generally in the form of a trough 13 having a relatively flat bottom wall 14 defining a conveying surface 15 and a pair of upwardly extending side walls 16. A pair of spaced apart support beams 18 are attached below the side edges of the bottom wall 14 and extend throughout the length of the conveyor 12 from the loading end 20 to the outlet end 22. Appropriate cross beams 24 extend between and are fastened to the support beams 18 to add rigidity to the conveyor. The base 10 has a platform 26 intermediate the ends thereof upon which is mounted a drive mechanism 28 including a motor 30, a driven sheave 31, an eccentric shaft 32 and a crank arm 33 for vibrating the conveyor 12. A plurality of arms or links 34 are pivotally connected at their one end to the support beams 18 of the conveyor 12 and are pivotally connected at their other end to the base member 10. A plurality of springs 36 bear at their upper ends against plates 38 secured to and extending transversely across the underside of the beams 18 of the conveyor 12, with opposite ends of the springs 36 bearing against plates 40 secured to the base member 10. The drive mechanism 28 imparts vibratory movement to the conveyor. The particular form of the vibration imparting system and the mounting of the conveyor apparatus to the base is not part of the present invention and will not be further described herein. An example of a typical vibrating means is shown in my U.S. Pat. No. 3,750,866.

From the apparatus so far described, it will be understood that as the conveyor 12 is vibrated by the drive mechanism 28 along a path determined by the springs 36 and links or arms 34 material or product on the trough 13 is advanced from the loading end 20 along the conveying surface 15 to the outlet end 22. At the outlet end 22 the product is either discharged onto another conveyor, into portable bins or the like.

Directing attention to FIGS. 2, 3 and 4, the loading end 20 of the conveyor 12 has a discrete accumulating hopper portion 42 which is part of the conveyor but is, in this form of the invention, a separate portion uniquely connected to the remainder of the conveyor. The accumulating hopper 42 has a bottom wall 44 and upstanding side walls 46 which are supported by gusset plates 48. A pair of reinforcing beams 50 are secured along the side edges of said bottom wall 44 and extend downwardly therefrom. It will be noted from FIG. 2 that the reinforcing beams 50 converge from a high point at the entry end of the conveyor to a lower point at the discharge end of the hopper where the hopper 42 dumps onto trough 13 of the conveyor.

A transversely extending I-beam 56 extends between the reinforcing beams 50 near the inlet end of the conveyor. It will be noted in FIG. 3 that the support beams 18 of the elongated conveyor 12 have vertical walls 58 spaced apart a distance slightly greater than the spacing between the vertical walls 57 of the reinforcing beams 50 of the hopper 42 so that the transverse beam 56 extending below the lower flange of the support beam 50 will be spaced from the walls 58 of the beams 18. The discharge end of the hopper 42 is mounted at 59 to the elongated conveyor 12 by having the end portion of the hopper remote from the transverse beam 56 secured to the support beams 18. A spacer plate 62 is bolted by bolts 60 between the flanges of the support beam 18 and the reinforcing beam 50 on both sides of the hopper. The bolts are spaced longitudinally along the axis of the hopper which together with the spacers 62 substantially support the opposite end or inlet end of the hopper in a cantilever fashion.

A weight sensing mechanism 64 is bolted on a top flange 66 of the cross beam 24 extending between the support beams 18 with a load sensing cell 68 aligned along the center line of the conveyor. A lower flange 72 of the transverse beam 56 of the hopper has a mounting plate 74 bolted thereto with a downwardly projecting probe 76 aligned with and in contact with the load sensing cell 68 of the weight sensing mechanism 64. The mounting at the discharge end of the hopper and the support of the hopper afforded by the load cell maintains the hopper 42 in the proper attitude for conveying product along the bottom wall 44 of the hopper 42. To assure that the probe 76 on the hopper and the load cell 68 on the weight sensing mechanism are properly aligned, a tie rod 80 is provided as shown in FIG. 3. One end of the tie rod 80 is bolted at 82 to the vertical wall 58 of one support beam 18 with the other end bolted at 84 to a depending flange of an angled bracket 86 secured to the lower flange 72 of the transverse beam 56 of the hopper. The tie rod 80 will prevent the hopper from migrating side to side to misalign the probe 76 and the load cell 68. Located on each side of the hopper near the inlet end thereof is a bolt 88 passing through the parallel flanges of the beams 18 and 50 with a compression spring 90 bearing against the flange of the beam 50 and against a nut 92 on the bolt. The compression springs 90 load the hopper 42 in the direction necessary to maintain the probe 76 against the load cell 68 even when the hopper is empty.

INDUSTRIAL APPLICABILITY

The improved accumulating conveyor may be used to convey weighted batches of product sequentially along the conveyor 14. The sequential conveying of the product will hold the product on the conveyor for a time frame which, along with the vibrating conveying action which vibrates, shakes and mixes the product as it is moved along the conveying surface, will deliver the product at the output end of the conveyor cooled to a desired temperature.

As a specific example, the conveyor may be used to convey hot castings 94 from a shakeout station to a processing station. The hot castings are fed by the feed conveyor 96 from a shakeout station into the hopper 42 at the loading end 20 of the elongate conveyor. When the hopper has received a batch of castings having a predetermined weight, the hopper 42 will deflect about the attached mounting 59 with the probe 76 activating the load cell 68, which in turn will energize the drive mechanism 28 to commence vibratory conveying of the batch of castings in the hopper longitudinally along the conveyor. The castings will drop from the bottom wall 44 of the hopper 42 onto the bottom wall 14 of the conveying surface 15. After a portion of the batch of castings passes out of the hopper, so that the load on the load cell 68 diminishes to a point that the load cell will be deenergized, the drive mechanism 28 will be shut off, stopping further vibratory feeding of the conveyor 12.

The castings will continue to be fed by the feed conveyor 96 onto the hopper until once again the load in the hopper exceeds the predetermined limit which will once again deflect the hopper to energize the load cell 68 to commence the drive mechanism 28 for vibrating the conveyor to advance the castings along the conveying surface. The vibratory conveying will shake and tumble the castings on the conveyor to further expose the surfaces of the casting to the air for cooling purposes, which will expedite cooling, as the batches are conveyed along the conveying surface. The loading of a batch of hot castings on the hopper, energizing the vibratory conveyor to convey the castings along the conveying surface as more castings are fed to the hopper, stopping the vibratory conveying as an additional batch of castings is added to the hopper is repeated continuously until the first batch of castings reaches the discharge end of the conveyor. The time frame between the castings first being fed onto the hopper until the castings reach the discharge end of the conveyor can be sequenced and set to provide adequate cooling for the castings so that they may enter the conveyor at a high temperature and be discharged at temperatures that permit safe handling, the cooling having taken place not only by the passage of time but also by the vibratory tumbling of the castings along the conveying surface, speeding up the cooling process. By the castings being fed to the hopper even as the conveyor is moving the castings out of the hopper produces an accumulation of castings on the conveyor that has substantially a uniform depth throughout the length of the conveyor.

I claim:

1. In a accumulating conveyor for conveying and cooling castings comprising a base, an elongated conveyor having a conveying surface, and drive means for vibrating said conveyor on said base for moving said castings along said conveying surface, the improvement comprising: an accumulating hopper defining a loading portion of said elongated conveyor, weight responsive means for weighing the castings fed to said accumulating hopper, said accumulating hopper being attached at one end portion to said conveyor in cantilever fashion and being supported at an inlet end portion on said weight responsive means, said weight responsive means starting and stopping said drive means for vibrating said conveyor, means extending transverse to the direction of conveyance of material on said conveyor and resiliently connecting the inlet end of the hopper to the conveyor to prevent side-to-side movement of the hopper during vibration, said drive means being activated upon the weight of the castings on said hopper reaching a predetermined amount for deflecting said accumulating hopper about said attached end portion an amount sufficient to be sensed by said weight responsive means for conveying the castings along the hopper and along the conveyor, and said drive means being deactivated upon the weight responsive means sensing the weight of the castings on said hopper falling below a predetermined amount whereby the accumulating hopper undeflects an amount sufficient to be sensed by said weight responsive means whereby the vibration of the conveyor is stopped.

2. In a vibratory apparatus for conveying accumulated castings comprising a base, an elongated conveyor having a loading end and a discharge end, and drive means for vibrating said conveyor on said base, the improvement comprising: an accumulating hopper for receiving castings at the loading end of said elongated conveyor and having a discharge end, said accumulating hopper being attached at a portion spaced from the loading end to said conveyor in cantilever fashion so that the loading end of the accumulating hopper can be deflected vertically downwardly as the weight of accumulated castings on the accumulator hopper increases, means responsive to a change in position of the loading end of the hopper for selectively starting and stopping said drive means and means cooperating between the conveyor and accumulating hopper at a position spaced from the discharge end thereof to prevent shifting of the accumulating hopper in a horizontal direction and to allow vertical deflection of the accumulating hopper as the weight of the castings in the accumulating hopper is varied.

3. The vibratory apparatus according to claim 1 wherein the means preventing side-to-side movement of the hopper comprises an elongate, bendable tie rod with spaced ends and, means connect one rod end to the conveyor and means connect the other rod end to the accumulating hopper.

4. The vibratory apparatus according to claim 2 wherein the means cooperating between the accumulating hopper and conveyor comprises an elongate, bendable tie rod with spaced ends and means connect one rod end to the conveyor and means connect the other rod end to the accumulating hopper.

5. The vibratory apparatus according to claim 3 wherein the tie rod is directed substantially horizontally and transverse to the direction of conveyance by the conveyor.

* * * * *